June 24, 1924.
J. H. KAUFFMAN
JACK
Filed March 26, 1923
1,498,551
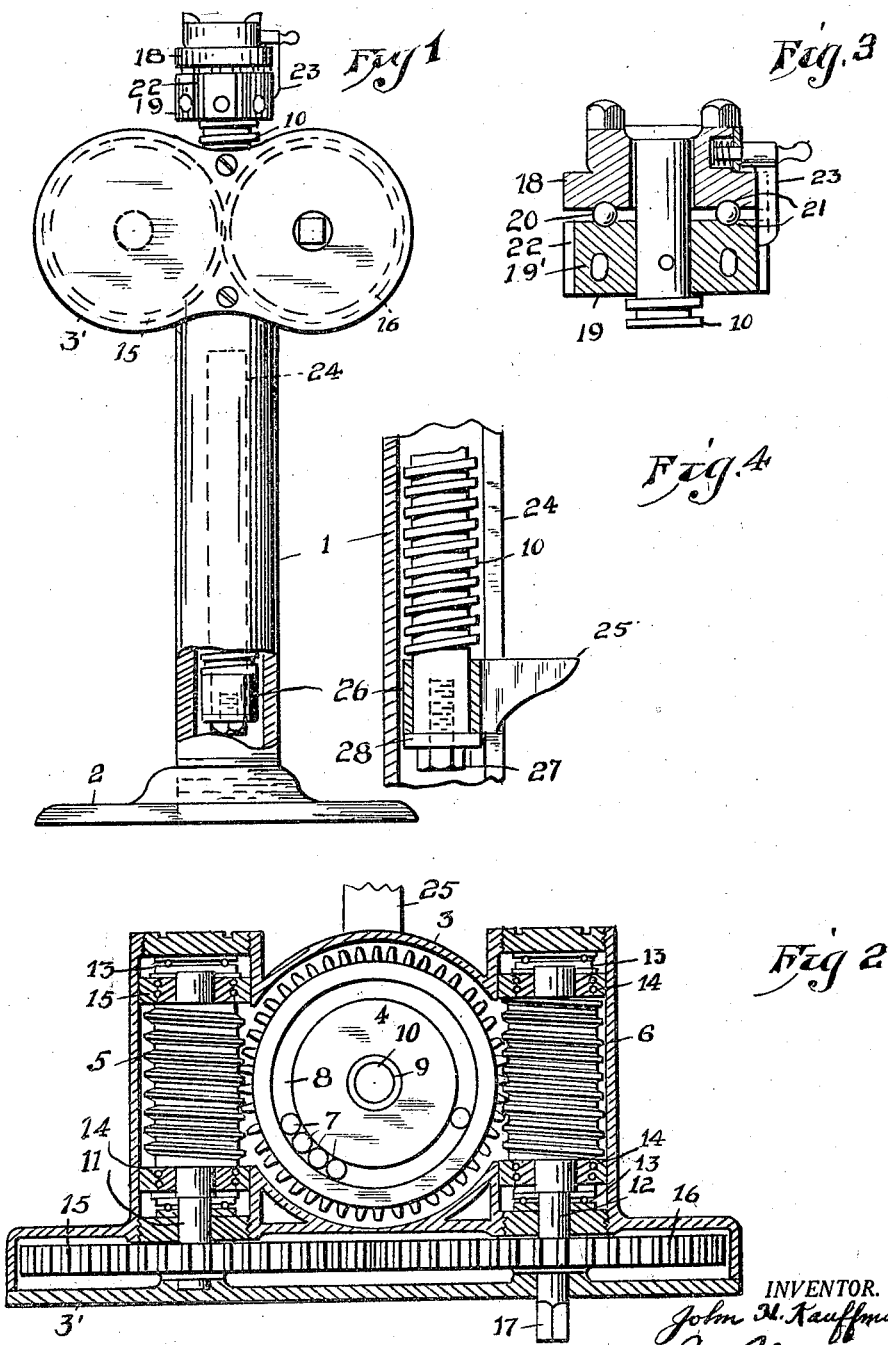
INVENTOR.
John H. Kauffman
BY Jack R Snyder
ATTORNEY Patented June 24, 1924.

1,498,551

UNITED STATES PATENT OFFICE.

JOHN H. KAUFFMAN, OF PITTSBURGH, PENNSYLVANIA.

JACK.

Application filed March 26, 1923. Serial No. 627,621.

*To all whom it may concern:*

Be it known that I, JOHN H. KAUFFMAN, a citizen of the United States, residing at Pittsburgh, in the county of Allegheny and State of Pennsylvania, have invented certain new and useful Improvements in Jacks, of which the following is a specification.

This invention relates to certain new and useful improvements in jacks and the objects thereof are to provide a powerful jack of the type described, in a manner as hereinafter set forth, which has two speeds adaptable for various capacities; which will hold the load without blocking and will not drop or run down; which includes novel operating means to facilitate the elevating and lowering operations; which is simple in its construction and arrangement, strong, durable and efficient in its use, and comparatively inexpensive to manufacture.

With the foregoing and other objects in view, which will appear as the description proceeds, the invention resides in the combination and arrangement of parts and in the details of construction hereinafter described and claimed, it being understood that changes in the precise embodiment of invention herein disclosed can be made within the scope of what is claimed without departing from the spirit of the invention.

In the drawing forming a portion of this specification and wherein like numerals of reference designate corresponding parts throughout the several views:—

Figure 1 is a vertical elevation of a jack in accordance with my invention.

Figure 2 is a bottom plan view of the operating mechanism.

Figure 3 is a sectional view of the head and locking collar.

Figure 4 is a fragmentary sectional view of the supports and associated parts.

Referring in detail to the drawing 1 denotes a vertically disposed hollow support provided with a suitable base 2. A gear casing 3 is fixed to the upper end of the support 1 and is provided to carry the worm wheel 4 together with respective worms 5 and 6 and operating spur gear wheels 15 and 16. The casing 3 includes a detachable cover plate 3′ to permit of the assembly of the gearing therein.

The worm wheel 4 is disposed horizontally and is supported for rotation upon the ball bearings 7, which latter are mounted in corresponding ball races 8 formed, respectively, on the under face of the worm wheel 4 and in the bottom of the casing 3. The worm wheel 4 is provided with a centrally disposed threaded bore 9 which is positioned directly over the hollow support 1 and adapted for engaging the elevating screw 10. The latter extends through the wheel 4 and into the hollow support 1.

The worms 5 and 6 are fixed on respective shafts 11 and 12. Each end of the shafts 11 and 12 is mounted for rotation in a pair of ball bearings 13 and 14. The ball bearings 13 and 14 are suitably supported in the gear casing 1, and facilitate the rotation of the worms, as the ball bearings 13 provide for the longitudinal thrust of the shafts 11 and 12 and the ball bearings 14 for the lateral thrust thereof.

The worms 5 and 6 are in mesh with the worm wheel 4 at points diametrically opposite to each other, and their shafts 11 and 12 are provided with spur gear wheels 15 and 16, the teeth of which are in mesh, so that the rotation of one worm will effect the rotation of the other, but in the reverse direction. The worm shaft 12 is the driver and is formed with a squared extension 17 projecting forwardly through the side of the casing 3 and adapted for the reception of a socketed manipulating handle or crank.

A head 18 is swivelly connected to the upper end of the screw 10 and is supported upon the locking collar 19. Ball bearings 20 are interposed between the head 18 and collar 19 and operate in a ball race 21 formed in the respective adjoining faces of the head 18 and collar 19, as clearly indicated in Figure 3, of the drawing.

The collar 19 is fixed to the screw 10 to turn therewith and has its periphery provided with a plurality of apertures 19′ and vertically disposed grooves 22, which latter are adapted to be engaged by the spring controlled latch 23, carried by the head 18, when it is desired to lock the screw 10 against movement in the head 18. When the latch 23 is released from the groove 22 the screw 10 is permitted to rotate in the head 18 for the purpose to be described.

The support 1 is formed with an elongated vertical slot 24 to provide clearance for the foot 25 which projects rearwardly therethrough, and is adapted to engage a load at a low elevation not capable of being engaged by the head 18 at the upper end of the screw 10.

The foot 25 is provided with a hub 26, mounted in the hollow support 1, through which the lower end of the screw 10 extends. The latter is pivotally connected in the hub 26 by means of the bolt 27 and collar 28 or in any other suitable manner. The periphery of the hub 26 slidably engages the inner wall of the hollow support 1 and acts as a guide for maintaining the screw 10 properly aligned in the hollow support 1.

When elevating or lowering a heavy load the screw 10 is first locked against rotation in the head 18 by manipulating the latch 23 to engage in a collar groove 22. The rotation of the driver shaft 11, by a crank, or in any other manner, will actuate the worm 5 and also the worm 6, connected to the worm 5 through the spur gear-wheels 15 and 16, and cause the rotation of the worm wheel 4 upon its ball bearings 7. The screw 10, being locked against rotation, as above stated, and threadably engaged in the central bore 9 of the worm wheel 4, will shift vertically in said bore 9 when the worm wheel 4 is rotated. The direction of such vertical movement is, of course, determined by the direction in which the driver shaft 11 is rotated by the operator.

The provision of a pair of synchronously actuated worms 5 and 6, for operating the worm wheel 4, equalizes the stress, to which the latter is necessarily subjected, whereby the operation of the apparatus is facilitated and uniform.

When elevating but a light load, the latch 23 is released from the collar groove 22 and the latter is rotated by the insertion of a suitable implement in the collar apertures 19'. The collar 19 being fixed to the screw 10, the latter will turn therewith and will shift rapidly in the bore 9 of the worm wheel 4. When the screw 10 is so operating the worm wheel 4 is locked against movement by its engagement with the worms 5 and 6.

What I claim is:—

In combination a jack comprising a vertical hollow support provided with a base, a gear casing fixed to the upper end of said support, a horizontally disposed worm wheel provided with a central threaded bore mounted on ball bearings, in said casing, a pair of oppositely disposed worms in mesh with said worm wheel, each of said worms fixed to a shaft having each end thereof mounted in a pair of ball bearings, one of said shafts formed with an extension projecting through said casing, a screw threadably engaged in said bore and extending into said hollow support, a head swivelly connected to the upper end of said screw, a collar fixed to said screw and carrying a ball bearing for said head and a latch for locking said head to said collar, substantially as described and for the purpose set forth.

In testimony whereof I affix my signature.

JOHN H. KAUFFMAN.